(12) United States Patent
Kim

(10) Patent No.: US 8,967,307 B2
(45) Date of Patent: Mar. 3, 2015

(54) COOLING APPARATUS FOR VEHICLE

(75) Inventor: Seunggi Kim, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 349 days.

(21) Appl. No.: 13/490,970

(22) Filed: Jun. 7, 2012

(65) Prior Publication Data

US 2013/0111926 A1 May 9, 2013

(30) Foreign Application Priority Data

Nov. 7, 2011 (KR) .................. 10-2011-0115184

(51) Int. Cl.
| | | |
|---|---|---|
| *B60K 11/00* | (2006.01) | |
| *F01P 5/02* | (2006.01) | |
| *F04D 25/06* | (2006.01) | |
| *F01P 9/00* | (2006.01) | |
| *F01P 11/10* | (2006.01) | |
| *F04D 25/08* | (2006.01) | |
| *F04D 27/00* | (2006.01) | |
| *F02B 29/04* | (2006.01) | |

(52) U.S. Cl.
CPC .............. *F01P 5/02* (2013.01); *F04D 25/0673* (2013.01); *F01P 9/00* (2013.01); *F01P 11/10* (2013.01); *F04D 25/08* (2013.01); *F04D 27/00* (2013.01); *F02B 29/0431* (2013.01); *F02B 29/0456* (2013.01); *Y02T 10/146* (2013.01)
USPC ..................................................... 180/68.1

(58) Field of Classification Search
CPC ...... B60L 11/1805; G05D 23/00; F01P 11/10
USPC ......... 180/68.1, 68.4, 68.6; 165/299, 95, 132, 165/287, 271, 303, 11.1; 62/5, 186, 183
See application file for complete search history.

(56) References Cited

U.S. PATENT DOCUMENTS

| | | | | | |
|---|---|---|---|---|---|
| 2,728,411 | A | * | 12/1955 | Pasturczak | 55/315.1 |
| 2,879,040 | A | * | 3/1959 | McInnes | 165/121 |
| 3,153,508 | A | * | 10/1964 | Sawyer | 417/243 |
| 3,759,054 | A | * | 9/1973 | Graber | 62/183 |
| 3,759,056 | A | * | 9/1973 | Graber | 62/183 |
| 3,926,000 | A | * | 12/1975 | Scofield | 62/121 |

(Continued)

FOREIGN PATENT DOCUMENTS

| | | |
|---|---|---|
| JP | 9-287450 A | 11/1997 |
| JP | 2002-67708 A | 3/2002 |

(Continued)

*Primary Examiner* — Brodie Follman
(74) *Attorney, Agent, or Firm* — Morgan, Lewis & Bockius LLP

(57) ABSTRACT

A cooling apparatus for a vehicle, may include an electric air compression pump generating compressed air using battery power of the vehicle, a main compressed air tank storing the compressed air generated by the electric air compression pump, a compressed air control valve fluid-connected to the main compressed air tank and controlling the compressed air to be discharged to a radiator when a temperature of cooling water flowing through the radiator exceeds a predetermined value, and an air amplification induction device disposed in front of the radiator and fluid-connected to the compressed air control valve, wherein the air amplification induction device induces compressed air discharged from the compressed air control valve, along an inner circumference of the air amplification induction device, such that the compressed air discharged from the compressed air control valve may be injected to the radiator.

7 Claims, 8 Drawing Sheets

(56) References Cited

U.S. PATENT DOCUMENTS

| | | | | |
|---|---|---|---|---|
| 4,443,236 A | * | 4/1984 | Peiler | 55/282.5 |
| 4,505,001 A | * | 3/1985 | Fasolino | 15/250.002 |
| 4,531,379 A | * | 7/1985 | Diefenthaler, Jr. | 62/236 |
| 4,555,910 A | * | 12/1985 | Sturges | 62/184 |
| 4,667,507 A | * | 5/1987 | Eriksson | 73/49.7 |
| 4,736,727 A | * | 4/1988 | Williams | 123/563 |
| 4,771,822 A | * | 9/1988 | Barbosa | 165/41 |
| 4,832,116 A | * | 5/1989 | Easton | 165/126 |
| 4,979,584 A | * | 12/1990 | Charles | 180/68.1 |
| 5,097,890 A | * | 3/1992 | Nakao | 165/206 |
| 5,101,775 A | * | 4/1992 | Hubbs | 123/41.01 |
| 5,117,898 A | * | 6/1992 | Light et al. | 165/299 |
| 5,181,554 A | * | 1/1993 | Mita | 165/41 |
| 5,490,392 A | * | 2/1996 | Williams et al. | 62/91 |
| 5,495,909 A | * | 3/1996 | Charles | 180/68.1 |
| 5,499,639 A | * | 3/1996 | Williams, Jr. | 134/7 |
| 5,522,457 A | * | 6/1996 | Lenz | 165/121 |
| 5,528,900 A | * | 6/1996 | Prasad | 62/175 |
| 5,588,482 A | * | 12/1996 | Holka | 165/44 |
| 5,879,466 A | * | 3/1999 | Creger et al. | 134/18 |
| 5,924,478 A | * | 7/1999 | Crocker | 165/95 |
| 6,022,200 A | * | 2/2000 | Myers | 417/423.15 |
| 6,217,638 B1 | * | 4/2001 | Van de Velde | 95/280 |
| 6,293,121 B1 | * | 9/2001 | Labrador | 62/304 |
| 6,318,155 B1 | * | 11/2001 | Carr | 73/49.7 |
| 6,443,253 B1 | * | 9/2002 | Whitehead et al. | 180/68.1 |
| 6,739,419 B2 | * | 5/2004 | Jain et al. | 180/68.1 |
| 6,772,602 B2 | * | 8/2004 | Vetter et al. | 62/239 |
| 7,040,328 B2 | * | 5/2006 | Woodard | 134/95.2 |
| 7,537,072 B2 | * | 5/2009 | Sturmon et al. | 180/68.1 |
| 7,727,492 B2 | * | 6/2010 | Myasnikov et al. | 422/198 |
| 7,998,245 B2 | * | 8/2011 | Demonie et al. | 95/20 |
| 8,276,650 B2 | * | 10/2012 | Martin et al. | 165/41 |
| 8,359,882 B2 | * | 1/2013 | Al-Eidan | 62/513 |
| 8,522,552 B2 | * | 9/2013 | Waterstripe et al. | 60/670 |
| 8,596,556 B2 | * | 12/2013 | Green | 239/337 |
| 2003/0141050 A1 | * | 7/2003 | Brocksopp | 165/299 |
| 2005/0028547 A1 | | 2/2005 | Hatakeyama | 62/324.1 |
| 2005/0121174 A1 | * | 6/2005 | Majarais et al. | 165/95 |
| 2005/0217840 A1 | * | 10/2005 | Dobler et al. | 165/271 |
| 2006/0037736 A1 | * | 2/2006 | Heyman | 165/95 |
| 2006/0185627 A1 | * | 8/2006 | Green | 123/41.49 |
| 2007/0079959 A1 | * | 4/2007 | Seto et al. | 165/299 |
| 2007/0114300 A1 | * | 5/2007 | Green | 239/128 |
| 2007/0125520 A1 | * | 6/2007 | Nutsos | 165/95 |
| 2007/0137837 A1 | * | 6/2007 | Martin et al. | 165/95 |
| 2009/0301796 A1 | * | 12/2009 | Wedderburn et al. | 180/2.2 |
| 2010/0314186 A1 | * | 12/2010 | Ma | 180/165 |
| 2011/0224559 A1 | * | 9/2011 | Chen | 600/493 |
| 2011/0231047 A1 | * | 9/2011 | Aixala et al. | 701/22 |
| 2011/0308241 A1 | * | 12/2011 | Huff et al. | 60/327 |
| 2012/0041628 A1 | * | 2/2012 | Hermann et al. | 701/22 |
| 2013/0043018 A1 | * | 2/2013 | Wikstrom | 165/299 |
| 2013/0111926 A1 | * | 5/2013 | Kim | 62/5 |
| 2013/0255296 A1 | * | 10/2013 | Kardos et al. | 62/126 |

FOREIGN PATENT DOCUMENTS

| | | |
|---|---|---|
| JP | 2006-199095 A | 8/2006 |
| KR | 0149081 B1 | 6/1998 |
| KR | 10-0483150 B1 | 4/2005 |

* cited by examiner

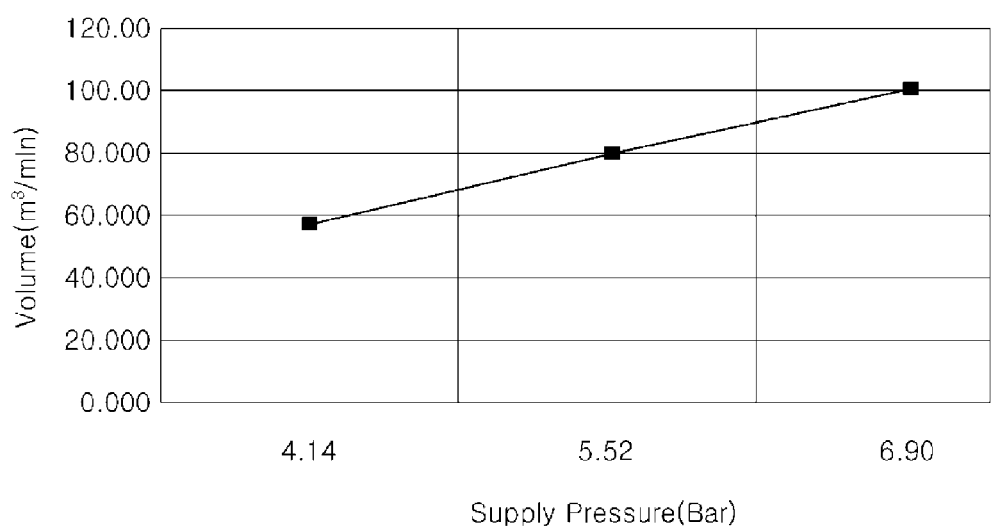

COOLING APPARATUS FOR VEHICLE

CROSS-REFERENCE TO RELATED APPLICATIONS

The present application claims priority to Korean Patent Application No. 10-2011-0115184 filed Nov. 7, 2011, the entire contents of which application is incorporated herein for all purposes by this reference.

BACKGROUND OF THE INVENTION

1. Field of the Invention

The present invention relates to a cooling apparatus for a vehicle, and more particularly, to a cooling apparatus for a vehicle, including a device which forcibly sends air to a radiator to increase a heat radiation effect of engine cooling water flowing through the radiator.

2. Description of Related Art

In general, an engine cooling apparatus for a vehicle includes a cooling device which is separately provided to cool down an engine heated at a high combustion temperature during operation. The engine cooling apparatus includes a heat sink shield, a ventilation fan, a motor for driving the ventilation fan, and an engine cooling water pump for forcibly circulating cooling water. The engine cooling apparatus forcibly sends air to the radiator so as to reduce the temperature of the cooling water connected to an engine body, thereby maintaining the cooling state of the engine.

As illustrated in FIG. 1, the forced circulation cooling apparatus includes a radiator 1, a ventilation fan 2, a water pump (not illustrated), a thermostat 3, and a reservoir tank 5. Radiator 1 passes heated cooling water through a heat sink such that the heated cooling water is contacted with external air, thereby cooling down the heated cooling water. Ventilation fan 2 is installed in the front or rear of radiator 1 and forcibly sends external air toward radiator 1 so as to increase a heat radiation effect. The water pump forcibly circulates the cooling water cooled by radiator 1 into the engine. Thermostat 3 is installed on a circulation path through which the cooling water circulated through the engine is returned toward radiator 1, and maintains the cooling water at an optimal temperature while automatically opened at a predetermined temperature or more and closed at the predetermined temperature or less. Reservoir tank 5 is connected to a radiator overflow pipe 4, and serves to temporarily store overflowing cooling water and supplement cooling water when the amount of cooling water is insufficient.

Since ventilation fan 2 of the cooling apparatus is driven by the power of the engine or a ventilation fan driving motor (not illustrated) which is separately installed, the cooling apparatus may add an extra load to the vehicle, thereby reducing the performance and fuel efficiency of the engine.

Further, the control structure for controlling the drive of the motor, in order to maintain the temperature of the cooling water circulated to the engine to a proper level, has a complicated construction. In addition, the cooling apparatus has fatal flaws which may stop the engine when a malfunction occurs.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to provide a cooling apparatus for a vehicle, which is capable of increasing a heat radiation effect of a radiator without adding an engine load of the vehicle.

In an aspect of the present invention, a cooling apparatus for a vehicle may include an electric air compression pump generating compressed air using battery power of the vehicle, a main compressed air tank storing the compressed air generated by the electric air compression pump, a compressed air control valve fluid-connected to the main compressed air tank and controlling the compressed air to be discharged to a radiator when a temperature of cooling water flowing through the radiator exceeds a predetermined value, and an air amplification induction device disposed in front of the radiator and fluid-connected to the compressed air control valve, wherein the air amplification induction device induces compressed air discharged from the compressed air control valve, along an inner circumference of the air amplification induction device, such that the compressed air discharged from the compressed air control valve is injected to the radiator.

The cooling apparatus may further include an engine air compression pump driving an air compressor using the power of the engine and generating compressed air, and an auxiliary compressed air tank storing the compressed air generated by the engine air compression pump.

The cooling apparatus may further include an auxiliary air valve mounted between the main compressed air tank and the auxiliary compressed air tank to control fluid-communication therebetween.

The cooling apparatus may further include an air supply line fluid-connecting the auxiliary compressed air tank, the auxiliary air valve, the main compressed air tank, the compressed air control valve, and the air amplification induction device in series, for supplying the compressed air of the auxiliary compressed air tank toward a side surface of the radiator.

The air amplification induction device is formed as a cylindrical shape to encompass the radiator, and may include an air inlet formed at a side of an outer circumference of the air amplification induction device, compressed air of the compressed air control valve being flowed therethrough, a small-diameter portion formed on an inner circumference of the air amplification induction device, and a large-diameter portion disposed adjacent to the small-diameter portion, wherein an inner diameter of the large-diameter portion increases towards from the radiator, and wherein an outlet is formed between the small-diameter portion and the large-diameter portion and fluid-connected to the air inlet.

The cooling apparatus may further include a vortex tube having a space formed to be recessed along the inner circumference of the air amplification induction device between the inlet, wherein a cross-sectional surface of the vortex tube may have a rectangular structure to generate air vortexes.

A ventilation fan is disposed in the air amplification induction device.

A compressed air control device is electrically connected to the compressed air control valve and receives a signal from a temperature sensor to control an opening degree of the compressed air control valve, the temperature sensor detecting the temperature of the cooling water flowing through the radiator.

According to the exemplary embodiments of the present invention, the air amplification induction device using the Coanda effect as well as a fan, a heat sink shield, and a motor driving the fan are installed in the front or rear side of the radiator so as to forcibly send air. Therefore, an electrical load element is removed to thereby improve the performance of the engine.

Further, the electric air compression pump is driven at normal times, and the engine air compression pump is driven when a problem occurs in the power supply system of the vehicle, which makes it possible to minimize an engine load.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

BRIEF DESCRIPTION OF THE DRAWINGS

FIG. 8 is a graph showing the pressure-volume relation exhibited by the cooling apparatus for a vehicle according to the exemplary embodiments of the present invention.

Figure 1:
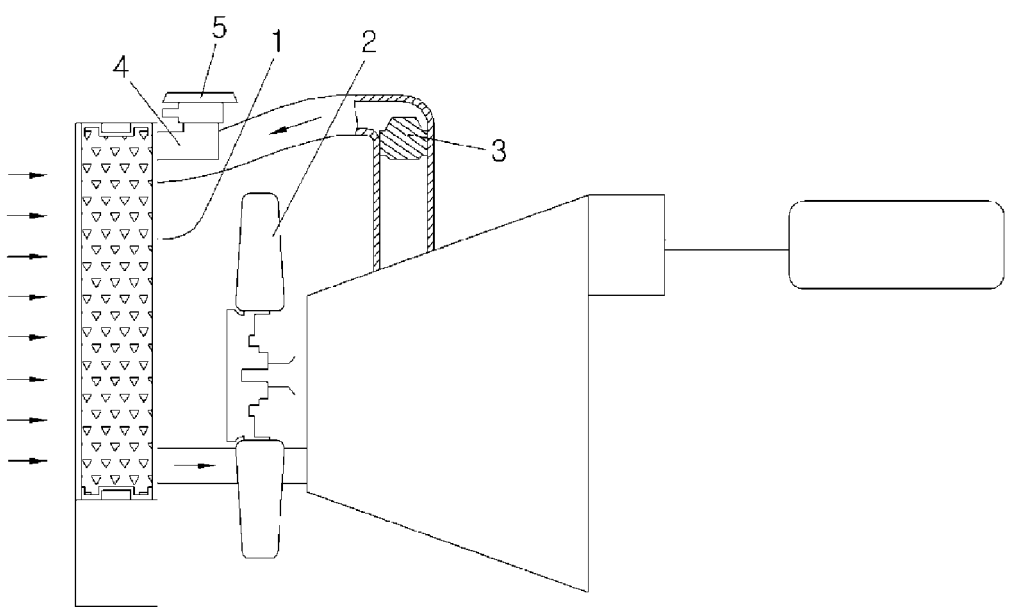
FIG. 1 schematically illustrates the structure of a cooling apparatus for a vehicle according to the related art.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, the exemplary embodiments of the present invention will be described in detail with reference to the accompanying drawings.

Figure 2:
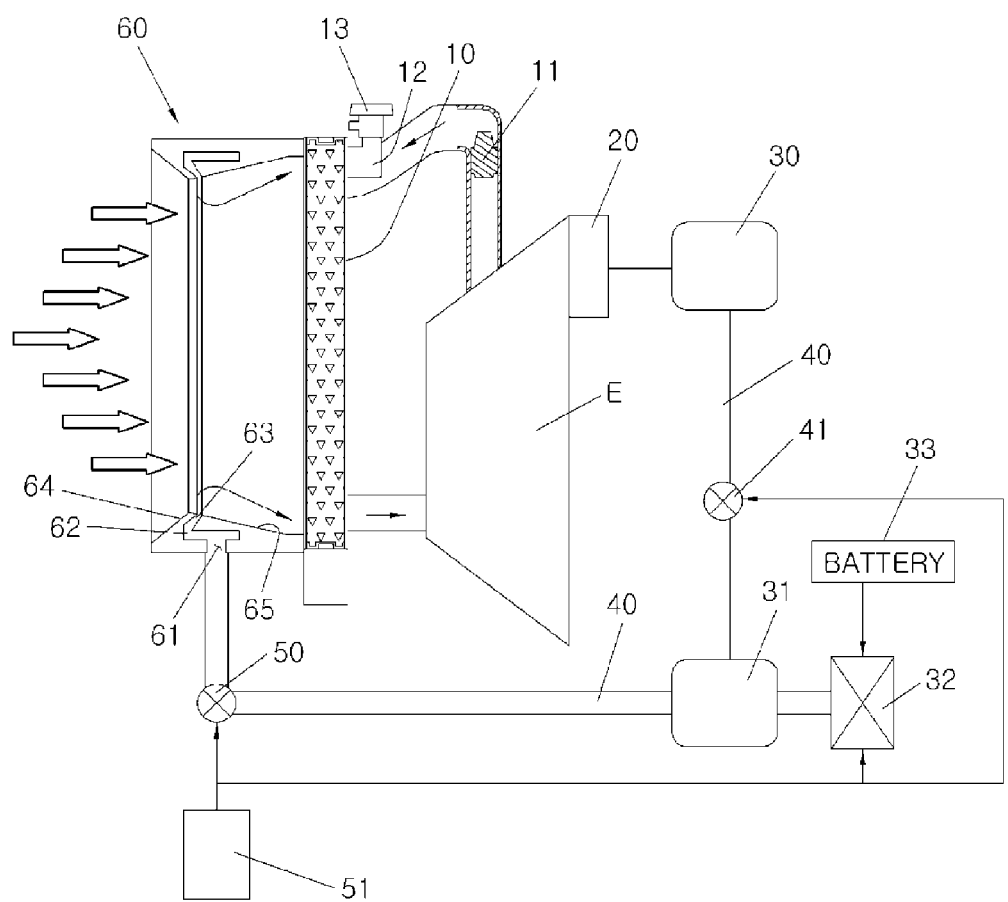
FIG. 2 schematically illustrates the structure of a cooling apparatus for a vehicle according to various exemplary embodiments of the present invention.

FIG. 2 schematically illustrates the structure of a cooling apparatus for a vehicle according to a first exemplary embodiment of the present invention. As illustrated in FIG. 2, the cooling apparatus for a vehicle according to the first exemplary embodiment of the present invention includes a radiator 10, an engine air compression pump 20, a main compressed air tank 31, an auxiliary compressed air tank 30, an air supply line 40, a compressed air control valve 50, and an air amplification induction device 60.

Radiator 10 serves to cool down cooling water heated by an engine E, and performs a heat exchange function such that cooling water flowing along a cooling line of a water jacket or the like, which is integrally formed in engine E, absorbs high-temperature heat of engine E and then radiates the heat to the outside. Furthermore, the cooling apparatus further includes a reservoir tank 13 connected to an overflow pipe 12 of radiator 10 and serving to temporarily store overflowing cooling water and supplement cooling water when the amount of cooling water is insufficient.

Engine air compression pump 20 compresses air using the power of engine E and pumps the compressed air to the air supply line. The compressed air is supplied to auxiliary compressed air tank 30 which is connected to engine air compression pump 20 and will be described below.

Auxiliary compressed air tank 30 is installed on air supply line 40 and serves to temporarily store the compressed air. Here, auxiliary compressed air tank 30 is mechanically driven by engine E.

Meanwhile, the cooling apparatus for a vehicle further includes an electric air compression pump 32 provided to generate compressed air using a battery 33 of the vehicle as a power source at normal times. Main compressed air tank 31 is disposed to store compressed air using electric air compression tank 32.

That is, electric air compression pump 32 is formed to supply compressed air to main compressed air tank 31 using an auxiliary power source such as a battery at normal times, separately from auxiliary compressed air tank 30. However, when electric air compression pump 32 is out of order, engine air compression pump 20 may be used to store compressed air in auxiliary compressed air tank 30. Furthermore, an auxiliary air valve 41 is installed between main compressed air tank 31 and auxiliary compressed air tank 30, and an opening degree of auxiliary air valve 41 is controlled to operate engine air compression pump 20 only when needed. Accordingly, unnecessarily consumption of the engine power may be reduced to obtain an effect of fuel efficiency reduction.

Meanwhile, a temperature sensor may be installed to measure the temperature of the cooling water flowing through radiator 10. According to temperature detected by the temperature sensor, the compressed air of air supply line 40 may be controlled.

Compressed air control valve 50 is installed on air supply line 40 and has an opening degree controlled by a signal of a compressed air control device 51 separately provided. Furthermore, air amplification induction device 60 is installed to supply a large amount of compressed air to an air path communicating with radiator 10 and increase a suction flow rate, when the temperature of cooling water flowing through radiator 10 exceeds a preset value. Furthermore, in order to reduce the consumption of compressed air when the temperature of the engine cooling water decreases, compressed air control valve 50 may be closed by compressed air control device 51.

Figure 3:
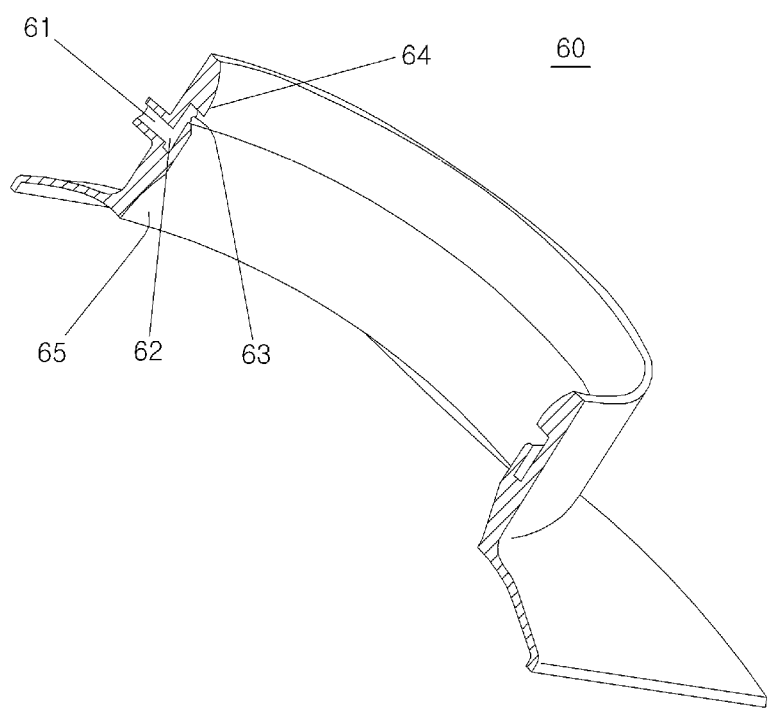
FIG. 3 is a perspective view of an air amplification induction device applied to the cooling apparatus for a vehicle according to the various exemplary embodiments of the present invention.

FIG. 3 is a perspective view of the air amplification induction device applied to the cooling apparatus for a vehicle according to the first exemplary embodiment of the present invention. As illustrated in FIG. 3, air amplification induction device 60 is formed in such a shape as to surround the outer circumference of radiator 10.

An inlet 61 is formed at one side of the outer circumference of air amplification induction device 60 and receives compressed air which is supplied according to an opening degree of compressed air control valve 50.

A vortex tube 62 is formed in such a manner as to refract the compressed air two or more times in a substantially vertical direction, when the compressed air passes through inlet 61. Vortex tube 62 induces the compressed air such that vortexes occur in the compressed air, thereby uniformizing the flow rate of the compressed air.

A ring-shaped outlet 63 is formed on the inner circumference of air amplification induction device 60, and discharges the compressed air having passed through vortex tube 62. In this case, the inter circumference of air amplification induction device 60 is formed in such a manner as to introduce the air toward the radiator 10, and the inner diameter of air amplification induction device 60 gradually decreases toward radiator 10. That is, a small-diameter portion 64 is formed on the inner circumference of air amplification induction device 60 in a remote side from radiator 10, and a large-diameter portion 65 of which the inner diameter increases toward radiator 10 from small-diameter portion 64 is formed. In this case, outlet 63 may be formed along small-diameter portion 64.

The operation of the above-described cooling apparatus for a vehicle according to the exemplary embodiment of the present invention will be described as follows.

At the initial stage of start-up of engine E, the temperature of cooling water circulating around the engine corresponds to 80 degrees or less. Therefore, a thermostat 11 is closed, and the cooling water circulates only around engine E.

When the cooling water is heated to 80 degrees or more while circulating only around engine E, thermostat 11 is opened to supply the cooling water to radiator 10, and the cooling water is cooled down by the air flowing through radiator 10. Then, the cooling water is reintroduced around engine E by the drive of the water pump, and cools down heat caused by combustion gas explosion of engine E.

In this case, when the temperature of the cooling water, detected by the temperature sensor, exceeds a preset value (for example, about 90 degrees), compressed air control device 51 controls compressed air control valve 50 to be opened toward inlet 61 such that the compressed air is supplied to inlet 61 from main compressed air tank 31.

Here, the flow of the compressed air is rapidly changed as vortexes occur while a small amount of the compressed air is passed through inlet 61 and refracted at least two times in a direction perpendicular to the advancing direction inside vortex tube 62. While the compressed air moves from small-diameter portion 64 to large-diameter portion 65 of air amplification induction device 60 at the same time as the compressed air passes through outlet 63, the compressed air flowing through the inside of air amplification induction device 60 is accelerated, and the flow of the compressed air discharged through outlet 63 becomes fast. Accordingly, a large amount of compressed air is forcibly sent to radiator 10.

Hereinafter, the descriptions of components and operations, which are overlapped with those of the cooling apparatus for a vehicle according to the first exemplary embodiment of the present invention, will be omitted.

Figure 4:
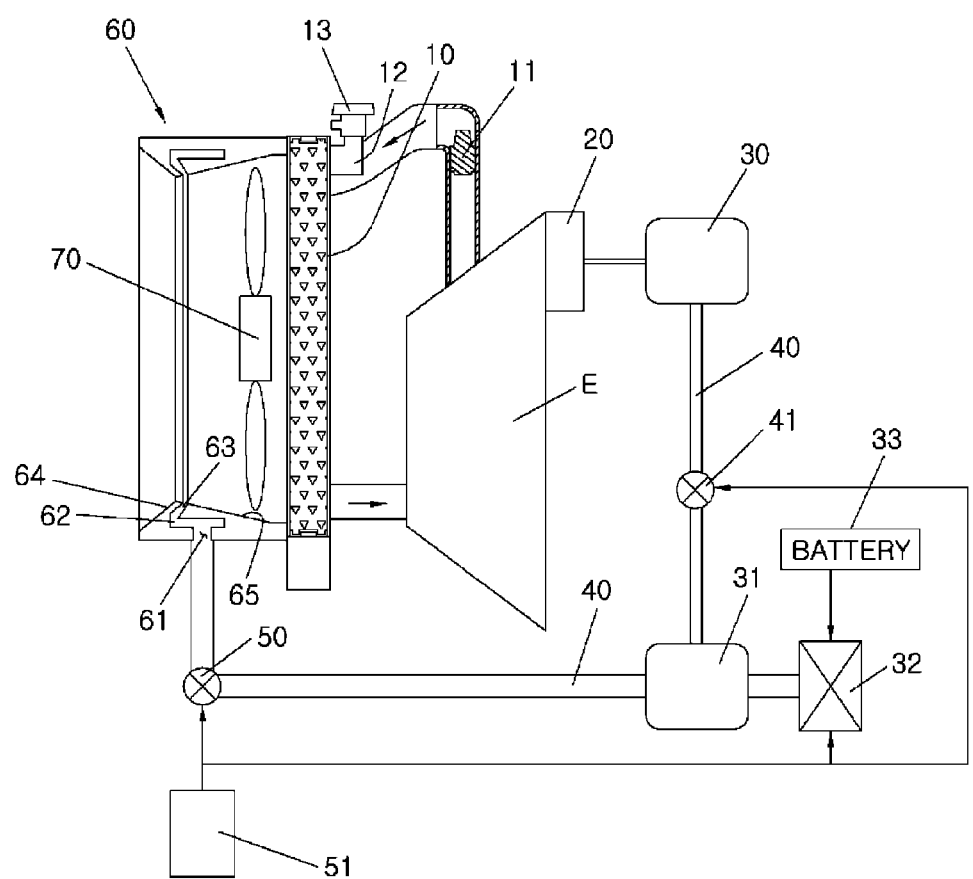
FIG. 4 schematically illustrates the structure of a cooling apparatus for a vehicle according to various exemplary embodiments of the present invention.

FIG. 4 schematically illustrates the structure of a cooling apparatus for a vehicle according to a second exemplary embodiment of the present invention. As illustrated in FIG. 4, a ventilation fan 70 may be installed in the front or rear side of the radiator in such a structure as illustrated in the first exemplary embodiment of the present invention.

That is, when the temperature of the cooling water flowing through radiator 10 increases to a high temperature, ventilation fan 70 which is integrated with an air blower motor for cooling an engine may forcibly send air to radiator 10.

Although a small amount of compressed air is supplied to inlet 61, the compressed air is quickly advanced along the inner circumference of air amplification induction device 60. Accordingly, a low pressure distribution is formed around air amplification induction device 60 and moves a large amount of air flowing through the inside of air amplification induction device 60 toward radiator 10. Therefore, a large amount of compressed air at a low temperature may be forcibly sent to radiator 10. Furthermore, the temperature of the air at the portion where the low pressure distribution is formed becomes lower than that of air surrounding the portion, which makes it possible to maximize an engine cooling effect.

Figure 5:
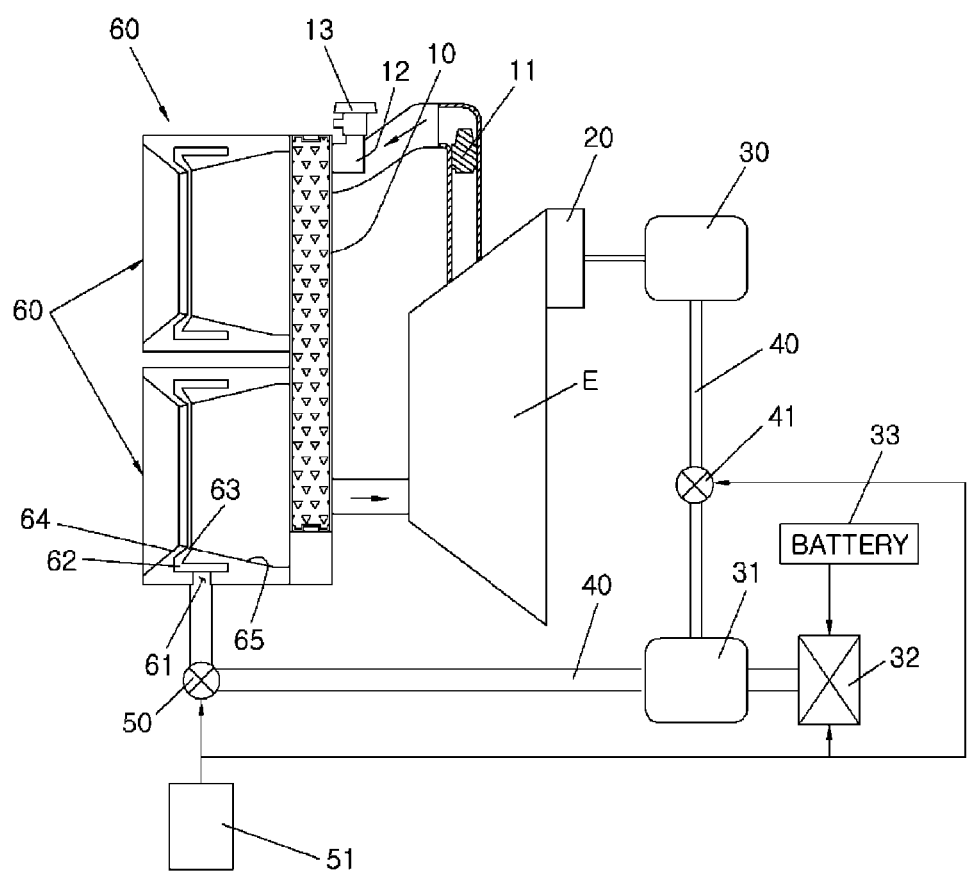
FIG. 5 schematically illustrates the structure of a cooling apparatus for a vehicle according to various exemplary embodiments of the present invention.

FIG. 5 schematically illustrates the structure of a cooling apparatus for a vehicle according to a third exemplary embodiment of the present invention. As illustrated in FIG. 5, a plurality of air amplification induction devices 60 may be installed to more quickly and uniformly spread a large amount of compressed air onto the surface of radiator 10, even though a small amount of compressed air is supplied through inlet 61.

Figure 6:
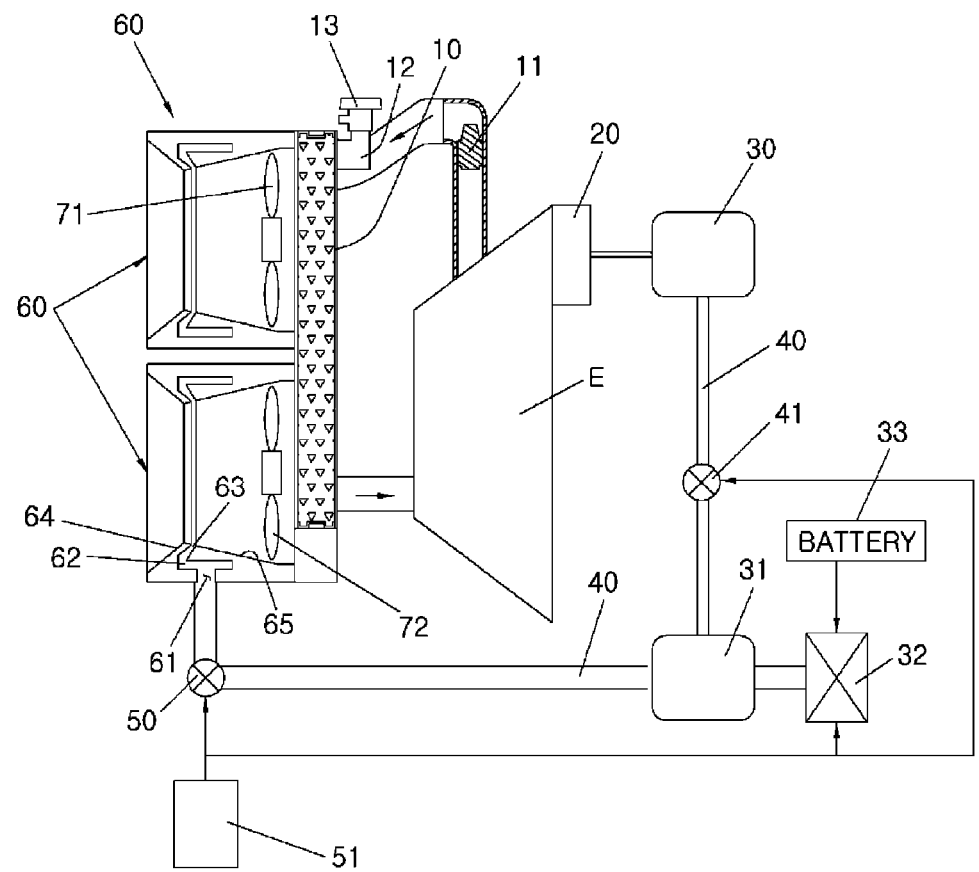
FIG. 6 schematically illustrates the structure of a cooling apparatus for a vehicle according to various exemplary embodiments of the present invention.

FIG. 6 schematically illustrates the structure of a cooling apparatus for a vehicle according to a fourth exemplary embodiment of the present invention. As illustrated in FIG. 6, ventilation fans 71 and 72 may be additionally mounted in air amplification induction devices 60, respectively, in the structure according to the third exemplary embodiment of the present invention, thereby further increasing the cooling speed.

Figure 7:
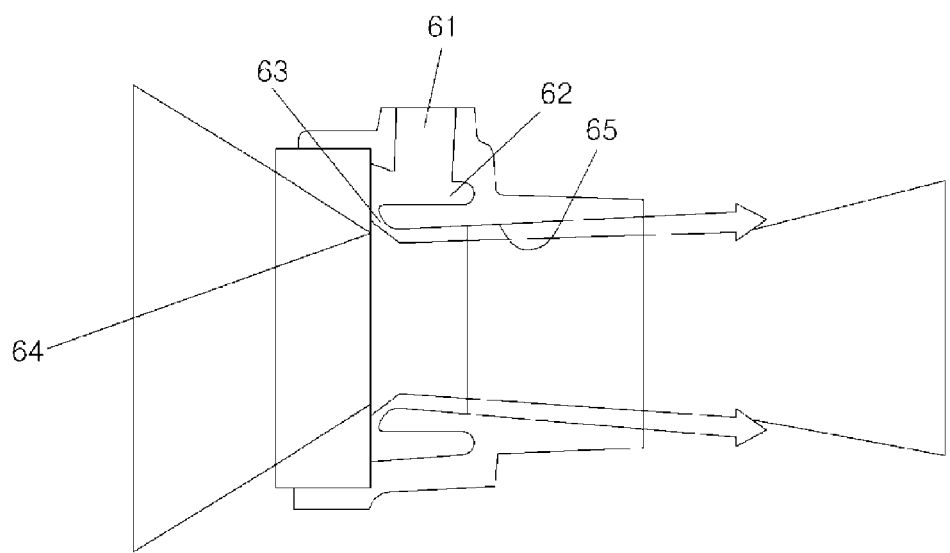
FIG. 7 illustrates the Coanda effect which is exhibited by the air amplification induction device applied to the cooling apparatus for a vehicle according to the exemplary embodiments of the present invention.

FIG. 7 illustrates the Coanda effect which is exhibited by the air amplification induction device applied to the cooling apparatus for a vehicle according to the exemplary embodiments of the present invention. FIG. 8 is a graph showing the pressure-volume relation exhibited by the cooling apparatus for a vehicle according to the exemplary embodiments of the present invention. As shown in FIGS. 7 and 8, it can be seen that the flow rate of air flowing through the inside of air amplification induction device 60 is increased by the compressed air supplied through inlet 61. That is, referring to FIG. 8, it can be seen that the flow rate of the compressed air gradually increases as the pressure of the compressed air supplied through inlet 61 increases.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A cooling apparatus for a vehicle, comprising: a battery and an engine; an electric air compression pump generating compressed air using battery power of the vehicle;
a main compressed air tank storing the compressed air generated by the electric air compression pump;
a compressed air control valve fluid-connected to the main compressed air tank and controlling the compressed air to be discharged to a radiator when a temperature of cooling water flowing through the radiator exceeds a predetermined value;
an air amplification induction device disposed in front of the radiator and fluid-connected to the compressed air control valve, wherein the air amplification induction device induces compressed air discharged from the compressed air control valve, along an inner circumference of the air amplification induction device, such that the compressed air discharged from the compressed air control valve is injected to the radiator;
an engine air compression pump driving an air compressor using the power of the engine and generating compressed air;
an auxiliary compressed air tank storing the compressed air generated by the engine air compression pump; and
an air supply line fluid-connecting the auxiliary compressed air tank, an auxiliary air valve, the main compressed air tank, the compressed air control valve, and the air amplification induction device in series, for supplying the compressed air of the auxiliary compressed air tank toward a side surface of the radiator.

2. The cooling apparatus as defined in claim 1, wherein the auxiliary air valve is mounted between the main compressed air tank and the auxiliary compressed air tank to control fluid-communication therebetween.

3. The cooling apparatus as defined in claim 1, wherein the air amplification induction device is formed as a cylindrical shape to encompass the radiator, and includes:
an air inlet formed at a side of an outer circumference of the air amplification induction device, compressed air of the compressed air control valve being flowed therethrough;
a small-diameter portion formed on the inner circumference of the air amplification induction device; and
a large-diameter portion disposed adjacent to the small-diameter portion, wherein an inner diameter of the large-diameter portion increases towards from the radiator, and wherein an outlet is formed between the small-diameter portion and the large-diameter portion and fluid-connected to the air inlet.

4. The cooling apparatus as defined in claim 3, further including:
a vortex tube having a space formed to be recessed along the inner circumference of the air amplification induction device between the inlet.

5. The cooling apparatus as defined in claim 4, wherein a cross-sectional surface of the vortex tube has a rectangular structure to generate air vortexes.

6. The cooling apparatus as defined in claim 1, wherein a compressed air control device is electrically connected to the compressed air control valve and receives a signal from a temperature sensor to control an opening degree of the compressed air control valve, the temperature sensor detecting the temperature of the cooling water flowing through the radiator.

7. A cooling apparatus for a vehicle, comprising:
an electric air compression pump generating compressed air using battery power of the vehicle;
a main compressed air tank storing the compressed air generated by the electric air compression pump;
a compressed air control valve fluid-connected to the main compressed air tank and controlling the compressed air to be discharged to a radiator when a temperature of cooling water flowing through the radiator exceeds a predetermined value; and
an air amplification induction device disposed in front of the radiator and fluid-connected to the compressed air control valve, wherein the air amplification induction device induces compressed air discharged from the compressed air control valve, along an inner circumference of the air amplification induction device, such that the compressed air discharged from the compressed air control valve is injected to the radiator,
wherein a ventilation fan is disposed in the air amplification induction device.

* * * * *